(12) United States Patent
Thoresz et al.

(10) Patent No.: US 10,747,493 B2
(45) Date of Patent: Aug. 18, 2020

(54) DISTRIBUTED PROVISIONING OF PROPERTIES OF OPERATIONAL SETTINGS OF A MEDIA PLAYBACK SYSTEM

(71) Applicant: SONOS, INC., Santa Barbara, CA (US)

(72) Inventors: Keith Thoresz, Belmont, MA (US);
Daniel Casimiro, Mansfield, MA (US);
Sachin Lad, Santa Barbara, CA (US);
Steven Beckhardt, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/030,461

(22) Filed: Jul. 9, 2018

(65) Prior Publication Data
US 2020/0012473 A1    Jan. 9, 2020

(51) Int. Cl.
*G06F 3/16* (2006.01)
*H04R 3/12* (2006.01)

(52) U.S. Cl.
CPC ............... *G06F 3/165* (2013.01); *H04R 3/12* (2013.01); *H04R 2227/005* (2013.01)

(58) Field of Classification Search
CPC ...... G06F 3/165; H04R 3/12; H04R 2227/005
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | Dilorenzo |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,611,537 B1 | 8/2003 | Edens et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

Almeida et al., "Interval Tree Clocks: A Logical Clock for Dynamic Systems," DI/CCTC, Universidade do Minho, Braga, Portugal, 2008, 13 pages.

(Continued)

*Primary Examiner* — Fan S Tsang
*Assistant Examiner* — David Siegel

(57) ABSTRACT

Devices, system, and methods are disclosed for provisioning devices over a cloud network in accordance with modifications to operational settings of a media playback system. In example embodiments, a playback device is provided that is configured to identify a change to a property of an operational setting of the media playback system. Based on the identified change, the playback device is configured to locally provision itself in accordance with the identified change to the property of the operational setting, cause at least one additional playback device to be provisioned in accordance with the identified change to the property of the operational setting, and cause a cloud computing device located outside of the media playback system to be provisioned in accordance with the identified change to the property of the operational setting.

20 Claims, 9 Drawing Sheets

(56) References Cited

U.S. PATENT DOCUMENTS

| | | | |
|---|---|---|---|
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,942,252 | B2 | 1/2015 | Balassanian et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0161635 | A1* | 7/2006 | Lamkin ............... G06F 16/4387 709/217 |
| 2007/0142944 | A1 | 6/2007 | Goldberg et al. |
| 2014/0277639 | A1* | 9/2014 | Gomes-Casseres .......................... H04N 21/4432 700/94 |
| 2015/0355879 | A1* | 12/2015 | Beckhardt ............... G06F 3/165 700/94 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Baldoni et al., "Fundamentals of Distributed Computing: A Practical Tour of Vector Clock Systems," IEEE Distributed Systems Online, Feb. 2002, 25 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Constantinou, Maria, "Tuning of rsync algorithm for optimum cloud storage performance," University of Bath, Department of Computer Science, Technical Report, 2013, 51 pages.
Corbett et al., "Spanner: Google's Globally-Distributed Database," Proceedings of OSDI, 2012, 14 pages.
DeCandia et al., "Dynamo: Amazon's Highly Available Key-value Store," SOSP '07, Stevenson, Washington, USA. Oct. 14-17, 2007, 16 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Ghemawat et al., "The Google File System," SOSP '03, Oct. 19-22, 2003, Bolton Landing, New York, USA, 15 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
Ratner, David Howard, "Roam: A Scalable Replication System for Mobile and Distributed Computing," Technical Report UCLA-CSD-970044, University of California, Los Angeles, Jan. 1998, 162 pages.
Sun et al., "Modeling a dynamic data replication strategy to increase system availability in cloud computing environments," Journal of Computer Science and Technology, Jun. 17, 2011, 17 pages.
Tridgell et al., "The rsync algorithm," Joint Computer Science Technical Report Series, The Australian National University, Jun. 1996, 8 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. 11/278,473, filed Apr. 3, 2006, "System and method for controlling devices to selectively facilitate synchronization of operations thereamong" Millington et al.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

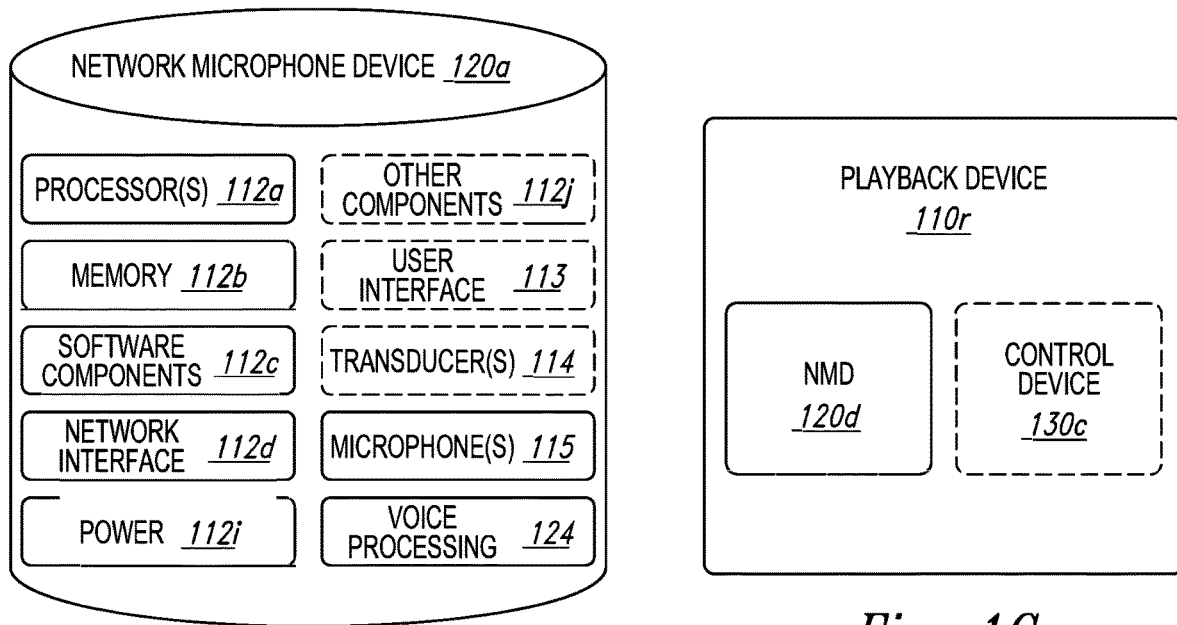
Fig. 1F
Fig. 1G
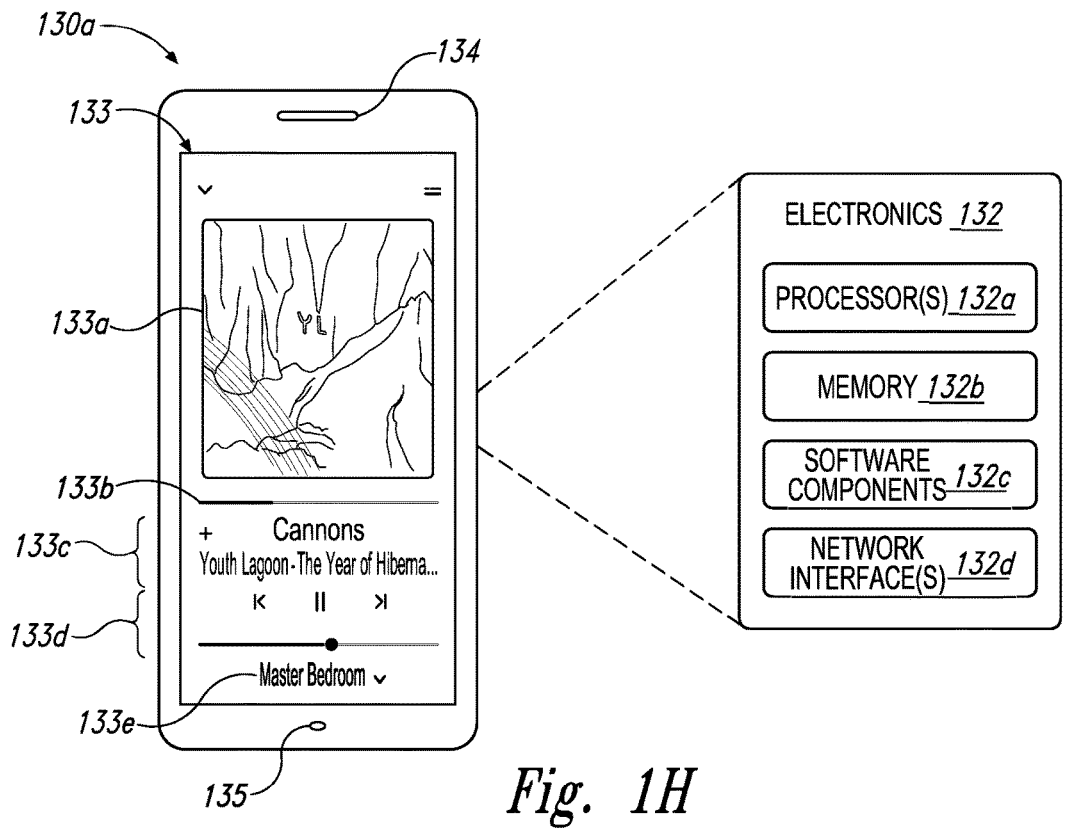
Fig. 1H

Fig. 2A

| SETTING ID | SEQUENCE | LOCAL REPL. | CLOUD REPL. |
|---|---|---|---|
| ACCOUNTS | 1 | HH:1 | - |

| RECORD ID | LOCAL VER. | CLOUD VER. | ORIGIN | ACCESS CREDENTIAL |
|---|---|---|---|---|
| ACCOUNT A | HH:1 | - | HH248 | TOKEN A1 |

Fig. 2B

| SETTING ID | SEQUENCE | LOCAL REPL. | CLOUD REPL. |
|---|---|---|---|
| ACCOUNTS | 3 | HH:3 | C:1 |

| RECORD ID | LOCAL VER. | CLOUD VER. | ORIGIN | ACCESS CREDENTIAL |
|---|---|---|---|---|
| ACCOUNT A | HH:1 | C:1 | HH248 | TOKEN A1 |
| ACCOUNT B | HH:2 | C:1 | HH248 | TOKEN B1 |

Fig. 2C

| SETTING ID | SEQUENCE | LOCAL REPL. | CLOUD REPL. |
|---|---|---|---|
| ACCOUNTS | 4 | HH:4 | C:1 |

| RECORD ID | LOCAL VER. | CLOUD VER. | ORIGIN | ACCESS CREDENTIAL |
|---|---|---|---|---|
| ACCOUNT A | HH:4 | C:1 | HH248 | TOKEN A2 |
| ACCOUNT B | HH:2 | C:1 | HH248 | TOKEN B1 |

Fig. 2D

| SETTING ID | SEQUENCE | LOCAL REPL. | CLOUD REPL. |
|---|---|---|---|
| ACCOUNTS | 5 | HH:4, HH:5 | C:1 |

| RECORD ID | LOCAL VER. | CLOUD VER. | ORIGIN | ACCESS CREDENTIAL |
|---|---|---|---|---|
| ACCOUNT A | HH:4 | C:1 | HH248 | TOKEN A2 |
| ACCOUNT B | HH:5 | C:1 | HH248 | TOKEN B2 |

Fig. 2E — 200e

| SETTING ID | SEQUENCE | LOCAL REPL. | CLOUD REPL. |
|---|---|---|---|
| ACCOUNTS | 6 | HH:6 | C:2 |

| RECORD ID | LOCAL VER. | CLOUD VER. | ORIGIN | ACCESS CREDENTIAL |
|---|---|---|---|---|
| ACCOUNT A | HH:4 | C:2 | HH248 | TOKEN A2 |
| ACCOUNT B | HH:5 | C:2 | HH248 | TOKEN B2 |

Fig. 2F — 200f

| SETTING ID | SEQUENCE | LOCAL REPL. | CLOUD REPL. |
|---|---|---|---|
| ACCOUNTS | 7 | HH:7 | C:2 |

| RECORD ID | LOCAL VER. | CLOUD VER. | ORIGIN | ACCESS CREDENTIAL |
|---|---|---|---|---|
| ACCOUNT A | HH:5 | C:3 | C534 | TOKEN A3 |
| ACCOUNT B | HH:6 | C:2 | HH248 | TOKEN B2 |

US 10,747,493 B2

DISTRIBUTED PROVISIONING OF PROPERTIES OF OPERATIONAL SETTINGS OF A MEDIA PLAYBACK SYSTEM

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partial schematic diagram of a control device.

FIG. 2A is a conceptual diagram of an example accounts replicated setting file stored by a playback device in its data storage at a first point in time.

FIG. 2B is a conceptual diagram of an example accounts replicated setting file stored by a playback device in its data storage at a second point in time.

FIG. 2C is a conceptual diagram of an example accounts replicated setting file stored by a playback device in its data storage at a third point in time.

FIG. 2D is a conceptual diagram of an example accounts replicated setting file stored by a playback device in its data storage at a fourth point in time.

FIG. 2E is a conceptual diagram of an example accounts replicated setting file stored by a playback device in its data storage at a fifth point in time.

FIG. 2F is a conceptual diagram of an example accounts replicated setting file stored by a playback device in its data storage at a sixth point in time.

Figure 1A:
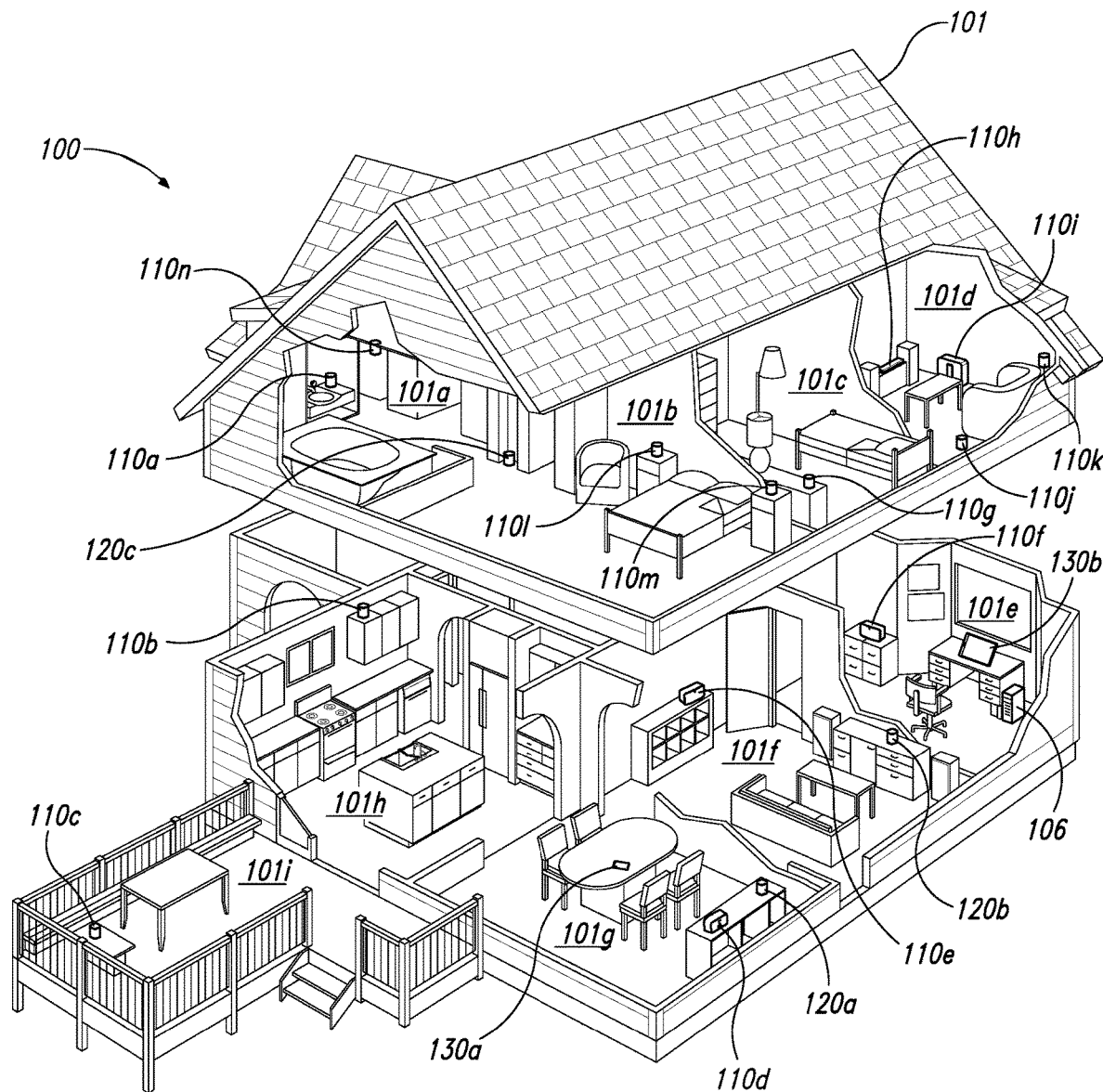
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein generally relate to a distributed architecture in which defining or changing a property of an operational setting of a media playback system results in playback devices of the media playback system, as well as at least one remote device (e.g., a cloud-service server), being provisioned in accordance with the defined or changed property of the operational setting. This distributed architecture helps to enable the media playback system to coordinate with the at least one remote device and to ensure that the media playback system is in a proper operational state.

As suggested above, a media playback system includes one or more playback devices that are connected to one another through a local communication network, such as a home WiFi network. The media playback system is decentralized such that each playback device operates independently of any other playback device and can act on behalf of the media playback system as a whole.

In such a media playback system, there are various operational settings that are applied uniformly by each playback device to ensure proper operation of the media playback system. Such settings may be referred to herein as "replicated settings." In general, a replicated setting defines or otherwise affects one or more operational states of a playback device. In practice, a replicated setting includes one or more properties, where each property can be set to different values. The value of a replicated-setting property at a given point in time defines or otherwise affects one or more operational states of a playback device that is provisioned with that replicated-setting property.

One example of a replicated setting is the encoding format of any line-in media source connected to a playback device of the media playback system. That replicated setting may include one property that can be set to either a value indicative of compressed or uncompressed audio. When set to the value indicative of compressed audio, a playback device that is provisioned with that property encodes line-in audio in a compressed format, whereas, when set to the value indicative of uncompressed audio, the playback device encodes line-in audio in an uncompressed format.

Another example of a replicated setting is account information for one or more media-service accounts (e.g., an account to a music service such as Spotify) that the playback devices of the media system can utilize to access corresponding media services. That replicated setting may include multiple properties (or multiple sets of properties) that generally enable playback devices to obtain media from the corresponding one or more media services. In particular, for each given media service, the replicated setting may include a plurality of properties (e.g., a login name, an access credential, and/or other account information) that a playback device utilizes to access media from the given media service.

In general, the definition of or modification to a replicated setting can enter the media playback system in a variety of manners. The media playback system is configured to handle defining replicated settings and subsequently modifying replicated settings in a similar manner. Accordingly, for sake of simplicity, the below discussion is with reference to modifying replicated settings but applies equally to defining replicated settings in the first instance.

In any event, the value of a replicated-setting property can be modified by a device within the media playback system, or a device within the media playback system can receive a modified value of a replicated-setting property from a device that is outside of the media playback system. For example, a control device of the media playback system can receive user inputs indicating a request to change the line-in encoding format from compressed to uncompressed. As another example, a cloud-service server communicatively coupled to the media playback system can generate, "refresh," or otherwise modify an access token for a given media service and provide that access token to a playback device of the media playback system. Other examples are also possible.

As a result of the decentralized nature of the media playback system, each playback device is configured such that a modification to a property of a replicated setting that enters the system at any given playback device results in all the other playback devices being provisioned in accordance with that defined or modified property. This functionality of the playback devices may be referred to herein as "local replication."

The local replication functionality may be implemented in a number of manners. For instance, in addition to a value of the replicated-setting property, each playback device maintains its own local version indicator (e.g., a sequence number or modification time indicator) signifying a version of the replicated-setting property that the playback device is presently provisioned in accordance with.

When a replicated-setting property is modified, the playback device at which the modification occurs provisions itself in accordance with the modification to the property (e.g., replaces its existing property value with the modified value), updates its local version indicator (e.g., stores a new vector clock value), and notifies the other playback devices of its updated version indicator. In turn, based on the updated local version indicator, each other playback device determines that there is a new version of the replicated-setting property (e.g., because its own version indicator for the replicated-setting property is older than the version indicator provided by the notifying playback device). Then, based on that determination, each other playback device obtains the modified replicated-setting property from the notifying playback device and provisions itself accordingly (e.g., by replacing its own replicated-setting property value with the modified value) and also updates its own local version indicator (e.g., stores the new vector clock value). Other example processes for local replication are also possible.

Without the local replication functionality, some playback devices may operate in one manner that conflicts with another manner in which other playback devices are operating, which can result in the media playback system operating abnormally (if at all). Moreover, the local replication functionality is advantageous because each playback device maintains its own record of the replicated settings. As such, if one playback device is disconnected from the media playback system, is powered down, or otherwise is no longer available, the remainder of the media playback system continues to operate. Other advantages of the local replication functionality will be apparent to a person of ordinary skill in the art.

In addition to the technical challenges presented by the decentralized nature of the media playback system, the media playback system leverages or otherwise utilizes one or more remote computing devices that are located external to the media playback system (e.g., one or more cloud-service servers) and that provide media-related services on behalf of the media playback system. Such a remote computing device may be referred to herein as a "remote service." One example of a remote service is a voice assistant service ("VAS") that interfaces with media services on behalf of the media playback system in response to the media playback system receiving from a user a voice command regarding playback of media from a particular one of the media services that the user has an account with.

In practice, there are at least some replicated settings that a remote service utilizes in order to function properly with and/or on behalf of the media playback system. For instance, continuing with the VAS example, that service may utilize the media-service accounts replicated setting to facilitate causing the particular media service to stream media to the media playback system for playback in accordance with the user's voice command. Without this replicated setting from the media playback system, the VAS would be unable to cause the particular media service to provide the media playback system with the media that the user requested. Replicated settings that are distributed to one or more remote services may be referred to herein as "cloud replicated settings."

As noted above, replicated settings can be modified in a variety of manners, and this applies equally to cloud replicated settings. In operation, a modification to a cloud replicated setting can enter the overall distributed architecture that includes the media playback system and the one or more remote services in different manners. For instance, the modification could enter through the media playback system (i.e., a "player-side modification") or the modification could enter through a remote service (i.e., a "remote modification").

When there is a player-side modification to a cloud replicated setting, the media playback system is configured to carry out a multi-phase process involving a local replication phase and a cloud replication phase. In general, the local replication phase is performed in line with the local replication process described before. In the cloud replication phase, broadly speaking, the media playback system causes at least one remote service to be provisioned in accordance with the modification to the replicated setting.

To facilitate the cloud replication phase, the media playback system is configured to designate one playback device (i.e., the "designated playback device") that interfaces with the remote service on behalf of the media playback system and manages cloud replicated settings. This arrangement involving a single playback device acting as a proxy between the media playback system and the remote service may provide one or more benefits. For instance, without the designated playback device, each playback device in the media playback system would perform network transactions with the remote service when there is a modification to a cloud replicated setting. Thus, the use of a designated playback device helps to reduce the overall amount of network resources that the media playback system consumes when it causes the remote service to be provisioned in accordance with changes to cloud replicated settings.

In any event, the cloud replication phase can involve a variety of processes. In one example of a cloud replication phase, the designated playback device first identifies a replicated-setting property that the remote service should be provisioned with based at least on the local version indicator corresponding to the identified replicated-setting property. Next, the designated playback device provides a replication dataset including the value of the identified replicated-setting property and a cloud-version (i.e., "remote-version") indicator signifying a version of the identified replicated-setting property that the remote service was most recently provisioned in accordance with.

The remote service then utilizes at least the received replication dataset to carry out a procedure similar to the local replication functionality described before to provision itself with the identified replicated-setting property. In this way, the designated playback device enables the remote service to operate with and/or on behalf of the media playback system in accordance with changes to replicated settings. Other example cloud replication phases are also possible.

Thus, in sum, a player-side modification to a cloud replication setting causes the execution of a local replication phase and a cloud replication phase, thereby facilitating coordination between the media playback system and the remote service that helps enable proper operation of the media playback system. This multi-phase replication process is beneficial because it allows the media playback system to maintain a replication structure that is independent of any remote service that might not be available to the media playback system at all times (e.g., as a result of network connectivity issues or the like). Other benefits of the multi-phase replication process will be apparent to a person of ordinary skill in the art.

As discussed before, in addition to handling player-side modifications to cloud replicated settings, the media playback system is configured to handle remote modifications to cloud replicated settings. One example of a remote modification to a cloud replicated setting is when a remote service (e.g., a VAS) receives a refreshed or otherwise modified version of a credential that provides access to a particular music service (e.g., an access token), which it might receive from another remote service (e.g., the particular music service itself or a service that interfaces with music services on behalf of media playback systems).

In any event, in at least some example embodiments, the designated playback device is further configured to receive from the remote service a request for the media playback system to initiate a replication based on a remote modification to a property of a replicated setting. This type of replication may be referred to herein as a "pull replication."

In response to receiving the request, the designated playback device initiates a pull replication phase, which may involve a variety of processes. In one example of a pull replication phase, the designated playback device first transmits to the remote service a cloud replication indicator representing a last known instance at which the remote service was provisioned in accordance with the particular replicated setting. Based on the cloud replication indicator, the remote service identifies at least one replicated-setting property that has undergone a remote modification since the last time the remote service was provisioned.

The designated playback device then receives from the remote service a replication dataset including the value of the identified replicated-setting property and a new cloud-version indicator signifying a version of the replicated-setting property that the remote service is presently provisioned with. The designated playback device utilizes at least the received replication dataset to provision itself with the modified replicated-setting property and then causes the other playback devices of the media playback system to carry out the local replication process described before based on the new cloud-version indicator. Other pull replication phases are also possible.

Thus, in sum, a remote modification to a cloud replication setting causes the execution of a pull replication phase that involves playback devices performing local replication based on replicated settings information from the remote service, thereby facilitating coordination between the media playback system and the remote service that helps enable proper operation of the media playback system.

At times, playback devices of the media playback system may be arranged in different geographic locations, but the playback devices maintain their respective memberships to the media playback system. For example, a user may establish her media playback system including a first and second playback device at her home on a first local communication network (e.g., her home WiFi network), but at a later time, the user may bring one of the playback devices (e.g., the second playback device) to her office and connect that playback device to a second local communication network (e.g., her workplace WiFi network). Such an arrangement may be referred to herein as a "split" media playback system, and each collection of one or more playback devices from the media playback system that are at a particular geographic location may be referred to herein as a "partition" of the media playback system. For example, in the above example, the first playback device is part of a "home" partition, while the second playback device is part of an "office" partition.

In a split media playback system, it may be beneficial for cloud replicated settings to be maintained across the different partitions of the split system. In other words, a change to a replicated setting in one partition should be reflected in all other partitions of the split media playback system. In this way, a user's experience with the media playback system at one geographic location (e.g., her home) will be the same as at another geographic location (e.g., her office).

To facilitate this functionality, the media playback system utilizes the same or similar functions described before, as well as some modifications and additions thereto.

For instance, a player-side modification to a property of a replicated setting from a first partition generally involves a designated playback device of the first partition facilitating the local replication phase and the remote replication phase. During the local replication phase, in addition to the processes described before, an origin indicator is stored that identifies the location (i.e., partition) at which the modification entered the media playback system. Then, during the remote replication phase, in addition to the processes described before, the designated playback device of the first partition passes this origin indicator to the remote service.

Based on the origin indicator, the remote service determines that the second partition should be provisioned with the modified property of the replicated setting, and in response, sends to a designated playback device of the second partition a request to initiate a pull replication. The designated playback device of the second partition then carries out the processes of the pull replication phase described before.

Thus, in sum, a player-side modification to a replicated setting at one partition of a split media playback system is handled by any other partitions as a remote modification to the replicated setting.

For a remote modification that does not originate from a partition of a split media playback system, a designated playback device of each partition receives a replication initiation request from the remote service and then, performs a pull replication with the remote service as described before.

Accordingly, the media playback system is configured such that replicated settings can be distributed to remote services and across partitions of a split media playback system to help ensure proper and consistent operation of the media playback system.

Thus, in one aspect, a playback device of a media playback system is provided. The playback device comprises a network interface configured to communicatively couple the playback device to (i) at least one additional playback device of the media playback system via a local communication network and (ii) a remote computing device located outside of the local communication network. The playback device also comprises one or more processors and tangible, non-transitory computer-readable memory having instructions stored thereon, wherein the instructions, when executed by the one or more processors, cause the playback device to: (a) identify a change to a property of an operational setting of the media playback system, wherein the property affects an operational state of the playback device; (b) based on the identified change to the property of the operational setting: (i) locally provision the playback device in accordance with the identified change to the property of the operational setting; (ii) determine a local version indicator corresponding to the playback device being locally provisioned in accordance with the identified change to the property of the operational setting; and (iii) based at least on the local version indicator, cause, via the local communication network, the at least one additional playback device to be provisioned in accordance with the identified change to the property of the operational setting; and (c) based at least on (i) the local version indicator and (ii) a remote-version indicator corresponding to a prior provisioning of the remote computing device, cause the remote computing device to be provisioned in accordance with the identified change to the property of the operational setting.

In another aspect, a computer-implemented method performed by a playback device of a media playback system is provided. The method comprises: (a) identifying a change to a property of an operational setting of the media playback system, wherein the property affects an operational state of the playback device; (b) based on the identified change to the property of the operational setting: (i) locally provisioning the playback device in accordance with the identified change to the property of the operational setting; (ii) determining a local version indicator corresponding to the playback device being locally provisioned in accordance with the identified change to the property of the operational setting; and (iii) based at least on the local version indicator, causing, via a local communication network, at least one additional playback device of the media playback system to be provisioned in accordance with the identified change to the property of the operational setting; and (c) based at least on (i) the local version indicator and (ii) a remote-version indicator corresponding to a prior provisioning of a remote computing device located outside of the local communication network and communicatively coupled to the playback device, causing the remote computing device to be provisioned in accordance with the identified change to the property of the operational setting.

In yet another aspect,

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices 120 ("NMDs") (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term "NMD" (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed, to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip hop music being played back by playback device 110c on the patio 101i. In some aspects, the playback devices 110c and 110f play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
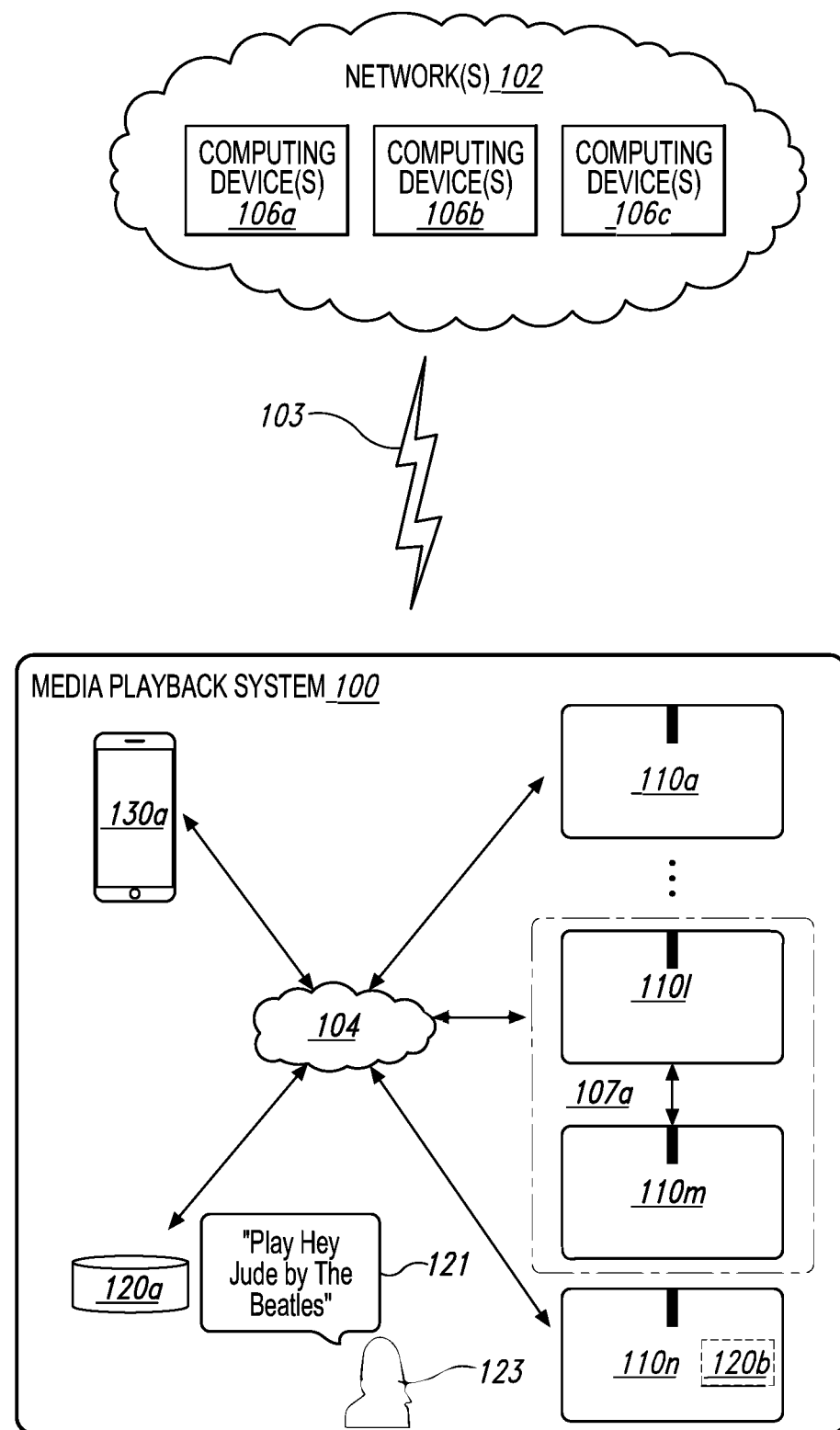
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g., voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices.

Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links. The network 104 may be referred to herein as a "local communication network" to differentiate the network 104 from the cloud network 102 that couples the media playback system 100 to remote devices, such as cloud services.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain embodiments, for example, the group 107*a* comprises a bonded zone in which the playback devices 110*l* and 110*m* comprise left audio and right audio channels, respectively, of multi-channel audio content, thereby producing or enhancing a stereo effect of the audio content. In some embodiments, the group 107*a* includes additional playback devices 110. In other embodiments, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated embodiment of FIG. 1B, the NMD 120*a* is a standalone device and the NMD 120*b* is integrated into the playback device 110*n*. The NMD 120*a*, for example, is configured to receive voice input 121 from a user 123. In some embodiments, the NMD 120*a* transmits data associated with the received voice input 121 to a voice assistant service (VAS) configured to (i) process the received voice input data and (ii) facilitate one or more operations on behalf of the media playback system 100.

In some aspects, for example, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103.

In response to receiving the voice input data, the computing device 106*c* processes the voice input data (i.e., "Play Hey Jude by The Beatles"), and determines that the processed voice input includes a command to play a song (e.g., "Hey Jude"). In some embodiments, after processing the voice input, the computing device 106*c* transmits commands to the media playback system 100 to play back "Hey Jude" by the Beatles from a suitable media service (e.g., via one or more of the computing devices 106) on one or more of the playback devices 110. In other embodiments, the computing device 106*c* may be configured to interface with media services on behalf of the media playback system 100. In such embodiments, after processing the voice input, instead of the computing device 106*c* transmitting commands to the media playback system 100 causing the media playback system 100 to retrieve the requested media from a suitable media service, the computing device 106*c* itself causes a suitable media service to provide the requested media to the media playback system 100 in accordance with the user's voice utterance.

b. Suitable Playback Devices

Figure 1C:
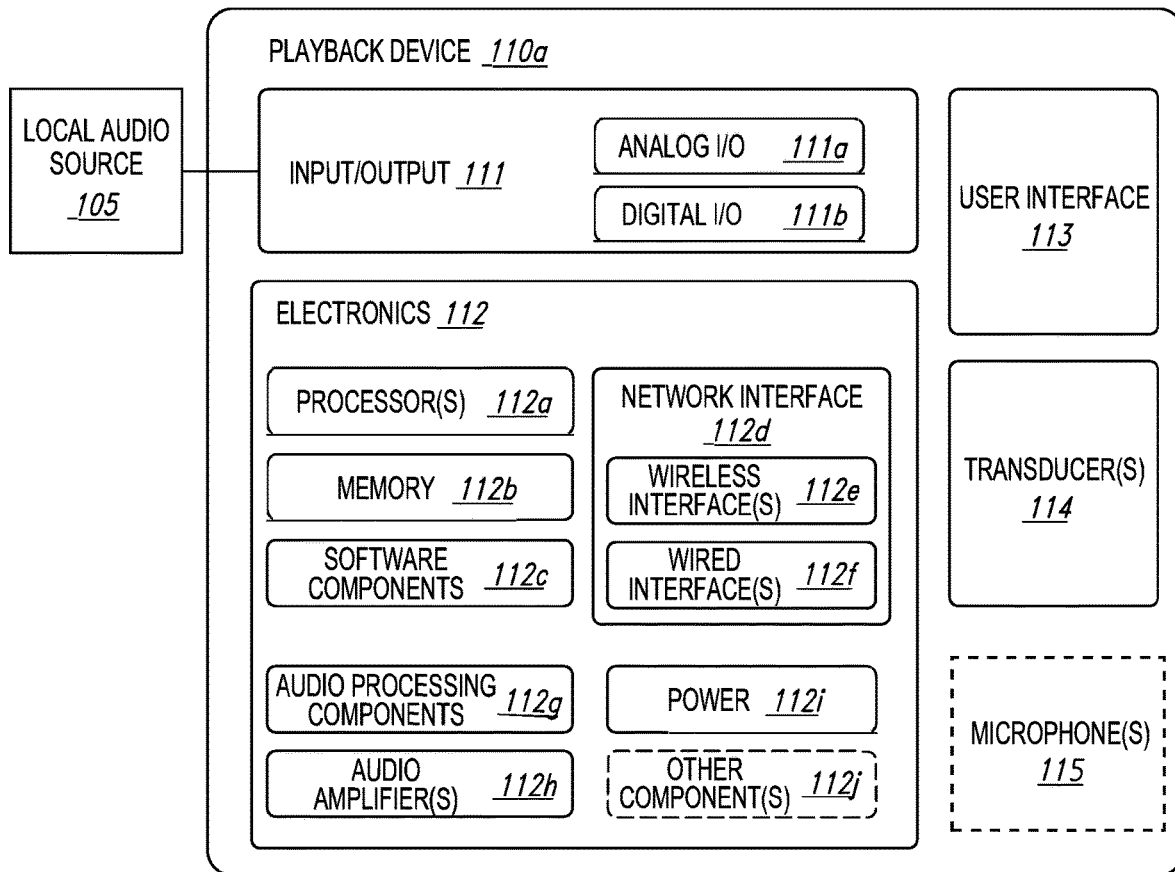
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises an High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 are configured to receive audio from an audio source (e.g., the local audio source 105) via the input/output 111 or one or more of the computing devices 106a-c via the network 104 (FIG. 1B), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
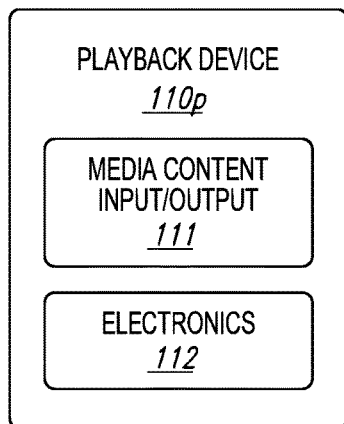
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
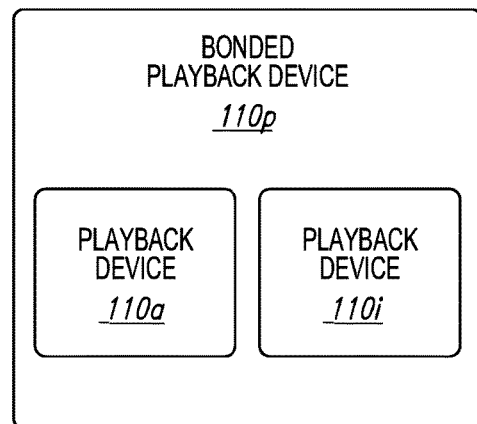
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110*i* is a subwoofer configured to render low frequency audio content. In some aspects, the playback device 110*a*, when bonded with the first playback device, is configured to render only the mid-range and high frequency components of a particular audio content, while the playback device 110*i* renders the low frequency component of the particular audio content. In some embodiments, the bonded playback device 110*q* includes additional playback devices and/or another bonded playback device.

c. Suitable Network Microphone Devices (NMDs)

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some embodiments, the NMD 120*a* is configured as a media playback device (e.g., one or more of the playback devices 110), and further includes, for example, one or more of the audio components 112*g* (FIG. 1C), the amplifiers 114, and/or other playback device components. In certain embodiments, the NMD 120*a* comprises an Internet of Things (IoT) device such as, for example, a thermostat, alarm panel, fire and/or smoke detector, etc. In some embodiments, the NMD 120*a* comprises the microphones 115, the voice processing 124, and only a portion of the components of the electronics 112 described above with respect to FIG. 1B. In some aspects, for example, the NMD 120*a* includes the processor 112*a* and the memory 112*b* (FIG. 1B), while omitting one or more other components of the electronics 112. In some embodiments, the NMD 120*a* includes additional components (e.g., one or more sensors, cameras, thermometers, barometers, hygrometers).

In some embodiments, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other embodiments, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partial schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated embodiment, the control device 130*a* comprises a smartphone (e.g., an iPhone™, an Android phone) on which media playback system controller application software is installed. In some embodiments, the control device 130*a* comprises, for example, a tablet (e.g., an iPad™), a computer (e.g., a laptop computer, a desktop computer), and/or another suitable device (e.g., a television, an automobile audio head unit, an IoT device). In certain embodiments, the control device 130*a* comprises a dedicated controller for the media playback system 100. In other embodiments, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 302 to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some embodiments, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Example Operations & Capabilities

As discussed before with reference to FIG. 1B, the media playback system 100 is communicatively coupled to a cloud network 102 that is outside of the local communication network 104 through which the playback devices 110a-110n and the control device 130a of the media playback system 100 communicate with one another. The cloud network 102 includes the computing device 106a (e.g., a cloud server) that, in example embodiments, provides a media-related service on behalf of the media playback system 100. This computing device 106a that is located remote to the media playback system 100 may be referred to below as "the remote service."

In a distributed architecture such as the one illustrated in FIG. 1B, the media playback system 100 and the remote service 106a are configured such that defining or modifying a property of certain operational settings of the media playback system 100 results in the media playback system 100 and the remote service 106a being provisioned in accordance with the defined or modified properties of these settings to ensure that the media playback system 100 is in a proper operational state. As noted before, this functionality may be referred to herein as "replication."

a. Replicated Settings

In the media playback system 100, there are various operational settings that are applied uniformly by each playback device 110a-110n to ensure proper operation of the media playback system 100. That is, each playback device 110a-110n is provisioned with the same values of these operational settings, which helps ensure that the media playback system 100 is operating in a steady state. As noted before, such settings may be referred to herein as "replicated settings."

Each playback device 110a-110n locally stores its own version of the replicated settings in data storage. A stored dataset corresponding to a particular replicated setting may be referred to herein as a replicated setting "file." Likewise, the remote service 106a locally stores its own version of at least some replicated settings in data storage. In example embodiments, the remote service 106a's stored dataset may be the same or similar to the replicated setting file locally stored by the playback devices 110a-110n.

In general, a replicated setting defines or otherwise affects one or more operational states of the playback devices 110a-110n of the media playback system 100. In other words, provisioning a playback device 110a-110n in accordance with a replicated setting affects some operational state of the playback device. In practice, a replicated setting includes one or more properties, where each property can be set to different values. The value of a replicated-setting property defines or otherwise affects one or more operational states of a playback device 110a-110n after that playback device is provisioned with the particular value of the replicated-setting property.

One example of a replicated setting is the encoding format of any line-in media source connected to any playback device 110a-110n of the media playback system 100. This replicated setting may include one property that can be set either to a value indicative of compressed audio or a value indicative of uncompressed audio. When set to the value indicative of compressed audio, a playback device 110a-110n that is provisioned with that value encodes line-in audio in a compressed format, whereas, when set to the value indicative of uncompressed audio, the playback device encodes line-in audio in an uncompressed format.

Some replicated settings may include one or more property sets, where each set itself includes one or more properties. A property set of a replicated setting may be referred to herein as a "record." Notably, some replicated settings are configured such that the number of records can change over time. That is, records can be added or removed from the replicated-setting file over time.

For instance, another example of a replicated setting is account information for one or more media-service accounts (e.g., an account for a music service such as Spotify) that the playback devices 110a-110n of the media playback system 100 can utilize to access corresponding media services (i.e., "the accounts replicated setting"). That replicated setting may include, for each given media-service account that is accessible by the media playback system 100, a particular record comprising one or more properties (e.g., a login name, an access credential, and/or other account information) that generally enable the playback devices 110a-110n to obtain media from the media service corresponding to the given media-service account.

To illustrate, FIG. 2A provides a conceptual diagram of an example accounts replicated setting file 200a stored by the playback device 110a in its data storage at a first point in time. As shown, the file 200a includes a file header 210a and a records segment 220a, each of which includes a variety of attributes whose respective values can be modified. The file header 210a includes a setting identifier 212a, a sequence indicator 214a, a local replication indicator 216a, and a cloud replication indicator 218a.

The setting identifier 212a uniquely identifies the particular replicated setting that is represented by the file 200a. In this example, the value of the setting identifier 212a is "ACCOUNTS" indicating that the file 200a corresponds to the accounts replicated setting.

The sequence indicator 214a identifies the particular version of the replicated setting that the playback device 110a is currently provisioned with. In the illustrated example, the value of the sequence indicator 214a is "1" indicating that this is the first version of the accounts replicated setting. When the playback device 110a provisions itself due to changes to properties of the accounts replicated setting, the sequence indicator 214a is incremented.

The local replication indicator 216a generally identifies one or more instances in which the playback device 110a locally provisioned itself due to a change in a property of the accounts replicated setting. The local replication indicator 216a can take a variety of forms. In some embodiments, the local replication indicator 216a takes the form of a time indicator that includes the value of one or more times corresponding to when the playback device 110a locally provisioned itself (i.e., a last-local-replication time indicator). In the illustrated example, the local replication indicator 216a takes the form of a local-replication vector clock with a value set to "HH:1" indicating a clock reading for a single instance of a change to the accounts replicated setting. As discussed later, the local replication indicator 216a is at times populated by one or more values from other attributes of the file 200a.

The cloud replication indicator 218a identifies a last known instance at which the remote service 106a was provisioned in accordance with the accounts replicated setting. The cloud replication indicator 218a can take a variety of forms. In some embodiments, the cloud replication indicator 218a takes the form of a time indicator that includes the value of a time corresponding to when the remote service 106a was last provisioned in accordance with the file 200a. In the illustrated example, the cloud replication indicator 218a takes the form of a cloud-replication vector clock with a value set to "-" representing a null value, which indicates that the remote service has yet to be provisioned with the properties set forth in the file 200a.

Turning now to the records segment 220a, that portion of the file 200a generally includes one or more records, each of which corresponds to a particular account for a given media service accessible by the media playback system 100. In the depicted example, there is a first record 230a (i.e., "ACCOUNT A" record) including a record identifier 232a, a local version indicator 234a, a cloud version indicator 236a, an origin indicator 238a, and an access credential 240a. As discussed later, additional records may be added to the records segment 220a over time.

In general, the record identifier 232a uniquely identifies the particular record from the other records stored by the playback device 110a. In this example, the record identifier 232a takes the form of a media-service account identifier (i.e., "ACCOUNT A"), which uniquely identifies the particular media-service account from other media-service accounts accessible by the playback device 110a.

The local version indicator 234a identifies the particular version of the ACCOUNT A record 230a that the playback device 110a is currently provisioned with. The local version indicator 234a can take a variety of forms. In some embodiments, the local version indicator 234a takes the form of a time indicator that includes a value of a time corresponding to when the playback device 110a locally provisioned itself in accordance with the particular version of the record 230a (i.e., a last modified time). In other embodiments, the local version indicator 234a takes the form of a sequence tracker that includes a sequence value corresponding to the playback device 110a being locally provisioned in accordance with the particular version of the record 230a. Other examples of local version indicators are also possible.

In the depicted example, the local version indicator 234a takes the form of a local-version vector clock with a value set to "HH:1" indicating a clock reading corresponding to when the playback device 110a was provisioned in accordance with the particular version of the ACCOUNT A record 230a, where the clock reading is based on a clock source of the media playback system 100 (as signified by the "HH" in the clock value). In this particular example, the clock source for the media playback system 100 is the value of the sequence indicator 214a. Other example clock sources for the media playback system 100 are also possible.

The cloud version indicator 236a identifies a last known instance at which the remote service 106a was provisioned in accordance with the particular version of the ACCOUNT A record 230a. The cloud version indicator 236a can take a variety of forms. In some embodiments, the cloud version indicator 236a takes the form of a time indicator that includes a value of a time corresponding to when the remote service 106a was last provisioned in accordance with the particular version of the ACCOUNT A record 230a. In other embodiments, the cloud version indicator 236*a* takes the form of a sequence tracker that includes a sequence value corresponding to the remote service 106*a* being locally provisioned in accordance with the particular version of the record 230*a*. Other examples of cloud version indicators are also possible.

In the illustrated example, the cloud version indicator 236*a* takes the form of a cloud-version vector clock with a value set to "-" representing a null value, which indicates that the remote service has yet to be provisioned in accordance with the particular version of the ACCOUNT A record 230*a*.

The origin indicator 238*a* uniquely identifies the origin of the particular version of the ACCOUNT A record 230*a*, such as the location at which the particular version of the record originated. In the example shown, the origin indicator 238*a* is set to "HH248" (e.g., a unique identifier assigned to the media playback system 100 when it is first set up) indicating that the ACCOUNT A record 230*a* was last modified via a device within the media playback system 100*a*.

Lastly, the access credential 240*a* is a credential that enables the playback device 110*a* to access the particular media service account (i.e., ACCOUNT A), which it may do to obtain media for playback from the appropriate media service server. In the depicted example, the access credential 240*a* takes the form of an access token with a value of "TOKEN A1."

FIG. 2A provides one possible example replicated setting file. In some implementations, additional or fewer attributes may be included in an example replicated setting data structure. For instance, in some embodiments, the file 200*a* may include one or more additional attributes in the file header 210*a* and/or in the records segment 220*a*. As one example, the record 230*a* may include a deleted indicator that identifies whether the particular account is active or inactive (i.e., deleted). For instance, the deleted indicator may be set to a first value representing that the account is active and to a second value representing that the account has been deactivated or deleted. Numerous other example replicated setting data structures are also possible.

Numerous other example replicated settings exist in addition to the aforementioned examples. For instance, another example of a replicated setting is an identification of one or more media sources (e.g., Internet radio stations) and/or media items (e.g., music tracks) that are preferred by users of the media playback system 100 (i.e., a "favorites" file).

Yet another example of a replicated setting is one or more playlists, where each playlist includes various features, such as a playlist identifier (e.g., a playlist name), identifiers (e.g., URIs or URLs) for multiple media items that are reproducible by the media playback system 100, and an indication of the order in which the media items are to be reproduced.

One other example of a replicated setting is one or more media alarms that are executable by the media playback system 100. Each media alarm may include various attributes, such as an alarm identifier, an alarm time, an alarm duration, an alarm media item that is played when the alarm is executed, an alarm zone that identifies the particular playback device that is affected by the alarm, and a linked zones indicator that identifies whether the alarm should affect all other playback devices that are linked (e.g., grouped) with the particular playback device when the alarm is executed. Various other example replicated settings exist.

b. Generating & Modifying Replicated Settings

In general, a replicated setting is generated or otherwise initially enters the media playback system 100 via a playback device 110*a*-110*n*. For instance, in example embodiments, a playback device 110*a*-110*n* is programmed to initially define certain replicated settings with respective predetermined values (e.g., "factory reset" or "default" values). However, for some replicated settings, an additional device facilitates a playback device 110*a*-110*n* of the media playback system 100 generating that replicated setting. For example, a playback device 110*a*-110*n* is configured to generate certain replicated settings in response to inputs provided by a user at the control device 130*a*. Other examples of the media playback system 100 originating replicated settings are also possible.

Like the origin of replicated settings, modifications to replicated settings can enter the media playback system 100 in a variety of manners. In general, a modified replicated setting enters the media playback system 100 by a playback device 110*a*-110*n* identifying a change to a property of a replicated setting, which it may do in a variety of manners. For example, the playback device 110*a* may receive a message indicating a change to a property of the playback device 110*a* and then determine that property is part of a replicated setting of the media playback system 100. As another example, the playback device 110*a* may receive a message indicating a change to a property, where the message itself indicates that the change affects a replicated setting of the media playback system 100. Other examples of a playback device identifying a change to a property of a replicated setting are also possible.

In example embodiments, a modified replicated setting can enter the media playback system 100 either via a device within the media playback system 100 (i.e., a "player-side modification") or via a remote computing device configured to handle replicated settings and that is located outside of the local communication network 140 (i.e., a "remote modification").

A player-side modification to a replicated setting generally involves a playback device 110*a*-110*n* identifying a change to a property of a replicated setting of the media playback system 100. For example, the control device 130*a* of the media playback system 100 receives user inputs indicating a request to change the line-in encoding format from compressed to uncompressed, the control device 130*a* notifies, via the local communication network 104, the playback device 110*a* of the requested change, and then the playback device 110*a* determines that the requested change applies to the line-in encoding format replicated setting based on, for instance, an identifier associated with the property or a lookup table. As another example, a cloud-service server 106 (e.g., a server configured to interface with media services on behalf media playback systems, such as a SONOS Music API ("SMAPI") service server) could refresh an access credential to a particular media service and provide that refreshed credential to the playback device 110*a*, which then determines that the refreshed credential applies to the accounts replicated setting. Other examples are also possible.

A remote modification to a replicated setting generally involves a remote computing device receiving an indication of a modification to a property of a replicated setting and then notifying a playback device 110*a*-110*n* that there has been a modification to a replicated setting. For example, a VAS server that interfaces with other remote services on behalf of the media playback system 100 may receive, from a particular media service or a SMAPI service, a refreshed access credential for a particular media-service account. The VAS server may determine that the refreshed access credential corresponds to the accounts replicated setting of the media playback system 100, and then notify a playback device 110*a*-110*n* of a modification to a replicated setting. Other example processes for a remote modification also exist.

Other example manners by which a modified replicated setting can enter the media playback system 100 are also possible.

c. Example Replication of Cloud Replicated Settings

In example embodiments, there are at least some replicated settings that the remote service 106*a* utilizes in order to function properly with and/or on behalf of the media playback system 100. For instance, the remote service 106*a* may take the form of a VAS and thus, may utilize the media playback system 100's accounts replicated setting to facilitate causing a particular media service to stream media to the media playback system 100 for playback in accordance with a user's request provided through a voice utterance. Without this replicated setting from the media playback system 100, the VAS 106*a* would be unable to cause the particular media service to provide the media playback system 100 with the media that the user requested. As noted before, replicated settings that are exchanged with the remote service 106*a* may be referred to herein as "cloud replicated settings."

In operation, a definition of or a modification to such a cloud replicated setting can enter the overall distributed architecture that includes the media playback system 100 and the remote service 106*a* in different manners. For instance, the definition or modification could enter through the media playback system 100 (i.e., a "player-side modification") or the definition or modification could enter through the remote service 106*a* (i.e., a "remote modification"). In general, the replication process is similar or the same when a replicated setting is defined or modified. For sake of simplicity, the below discussion is with reference to modifying replicated settings, but a person of ordinary skill in the art will appreciate that the below discussion applies to defining replicated settings as well.

Figure 3:
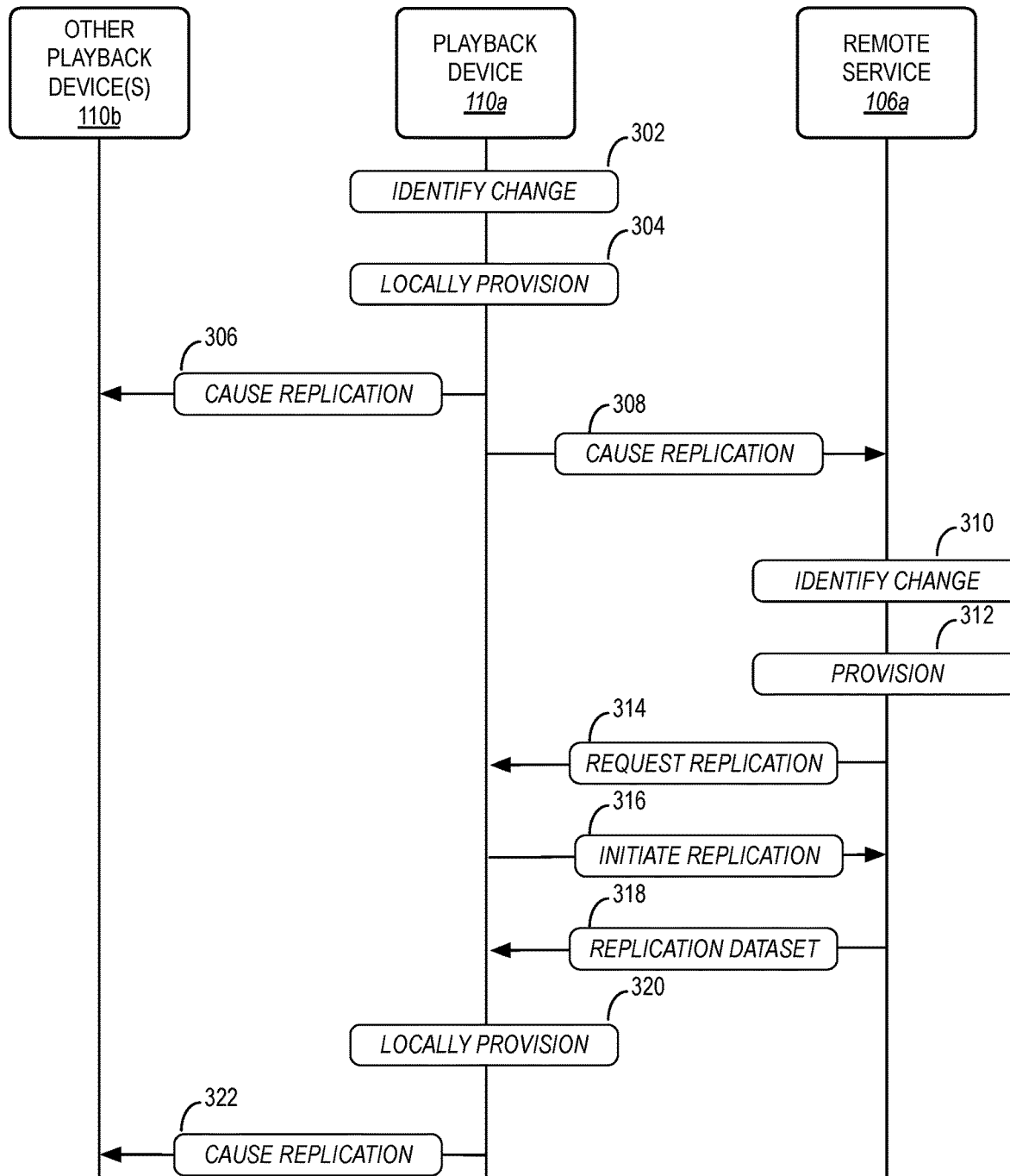
FIG. 3 is a message flow diagram illustrating data transactions between devices of a media playback system and a remote service.

For purposes of explanation and illustration of player-side and remote modifications to cloud replicated settings, FIG. 3 is a message flow diagram illustrating data transactions between devices of the media playback system 100 and the remote service 106*a*. In particular, the message flow diagram includes the playback device 110*a*, one or more other playback devices 110*b*-110*n* of the media playback system 100, and the remote service 106*a*.

When there is a player-side modification to a cloud replicated setting, the playback device 110*a* carries out a multi-phase process (i.e., steps 302-308) involving a local replication phase and a cloud replication phase.

In general, the playback device 110*a* carries out the local replication phase as a result of the decentralized nature of the media playback system 100. As part of local replication, each playback device 110*a*-110*n* is configured such that a modification to a property of a replicated setting that enters at any given playback device results in all the other playback devices being provisioned in accordance with that modified property. Thus, when the playback device 110*a* facilitates modifying a replicated setting, the playback device 110*a* may carry out a local replication phase to ensure that all other playback devices 110*b*-110*n* are provisioned accordingly. The local replication phase can include a variety of processes.

As one example of a local replication phase, at step 302 of FIG. 3, the playback device 110*a* identifies a change to a property of a cloud replicated setting. In general, the playback device 110*a* identifies a change to a cloud replicated setting as discussed before. For example, the playback device 110*a* may receive an indication of a modified value of a property of a replicated setting from another device.

For purposes of explanation, FIG. 2B provides a conceptual diagram of an example accounts replicated setting file 200*b* stored by the playback device 110*a* in its data storage at a second point in time. This second point in time is after the first point in time represented by FIG. 2A and is prior to the playback device 110*a* receiving the indication of the modified cloud replicated setting. For sake of clarity, not all reference numbers and lead lines from FIG. 2A have been reproduced in FIG. 2B.

In FIG. 2B, the file 200*b* indicates that after the first point in time there was a modification to the accounts replicated setting and a transaction with the remote service 106*a*. In particular, a second record 250*b* (i.e., "ACCOUNT B" record) was added to the file 200*a* corresponding to another media-service account that the playback device 110*a* was provisioned with.

Moreover, the cloud replication indicator 218*b* now identifies a last known instance at which the remote service 106*a* was provisioned in accordance with the properties set forth in the file 200*b*. As shown, the cloud replication indicator 218*b* includes a cloud-replication vector clock value of "C:1," where this clock reading is based on a clock source of the remote service 106*a* (as signified by the "C" in the clock value). Likewise, the cloud version indicator 236*b* now identifies a last known instance at which the remote service 106*a* was provisioned in accordance with the particular version of the ACCOUNT A record 230*b*, and a cloud version indicator 256*b* also identifies a last known instance at which the remote service 106*a* was provisioned in accordance with the particular version of the ACCOUNT B record 250*b*.

Lastly, the local replication indicator 216*b* indicates that the accounts replicated setting is at a steady state and does not need to be replicated to the remote service 106*a*. For instance, the local replication indicator 216*b* is set to a vector clock value of "HH:4," which is greater than (and differs from) the vector clock values of both the local version indicators 234*b* and 254*b*.

Returning to FIG. 3, at step 304, the playback device 110*a* locally provisions itself in accordance with the change to the property of the cloud replicated setting. The playback device 110*a* may perform this function in a variety of manners.

For instance, after receiving the indication of the modified value of the property of the cloud replicated setting, the playback device 110*a* may locate its locally stored version of the cloud replicated setting, update the existing value of the property with the modified value, and determine a local version indicator corresponding to the updated property value. In example embodiments, the playback device 110*a* determining a local version indicator corresponding to the updated property value generally involves identifying an existing local version indicator corresponding to the particular property, updating its value, and storing that value in place of the existing local version indicator.

To illustrate, FIG. 2C provides a conceptual diagram of an example accounts replicated setting file 200*c* stored by the playback device 110*a* in its data storage at a third point in time. This third point in time is after the second point in time represented by FIG. 2B and is after the playback device 110*a* locally provisioned itself in accordance with a change to the cloud replicated setting. In this example, the playback device 110*a* received an indication of a modified access credential for ACCOUNT A and provisioned itself with that new access credential.

As shown in the ACCOUNT A record 230c, the playback device 110a provisioned itself with a new access token (i.e., "TOKEN A2"). In particular, the playback device 110a identified the file 200b corresponding to the accounts replicated setting and incremented its stored value of the sequence indicator 214b to reflect a change to the file 200b, which resulted in the sequence indicator 214c shown in the file 200c. The playback device 110a updated the access credential 240c with the new access token, "TOKEN A2." Next, the playback device 110a updated the clock value of the local version indicator 234c to reflect when this provisioning occurred, where the clock value was based on the incremented value of the sequence indicator 214c. The playback device 110a also updated the local replication indicator 216c with the new clock reading from the local version indicator 234c. Since a value of the local replication indicator 216c now matches the value of the local version indicator 234c, the playback device 110a determines that cloud replication should be performed, which it does later at step 308.

At step 306, the playback device 110a causes the other playback devices 110b-110n to be provisioned in accordance with the change to the property of the cloud replicated setting. The playback device 110a may perform this function in a variety of manners.

In example embodiments, the playback device 110a causes the other playback devices 110b-110n of the media playback system 100 to be provisioned in accordance with the change to the property of the replicated setting based at least on the local version indicator corresponding to the modified property. For instance, the playback device 110a may send to the other playback devices 110b-110n a notification that includes the updated local version indicator.

In turn, based on the updated local version indicator from the playback device 110a, each other playback device 110b-110n determines that there is a new version of the replicated-setting property (e.g., because its own version indicator value is older than the updated version indicator value). Based on that determination, each other playback device 110b-110n obtains the modified replicated-setting property from the playback device 110a and provisions itself accordingly (e.g., by replacing its own replicated-setting property value with the modified value) and also updates its own version indicator.

As an illustrative example, returning to FIGS. 2B and 2C, while FIG. 2C reflects the playback device 110a's local copy of the accounts replicated setting at the third point in time, the playback device 110b's local copy of the accounts replicated setting at the third point in time (i.e., before the playback device 110a causes the playback device 110b to replicate the change) reflects what is shown in FIG. 2B.

After the playback device 110b receives the value of the updated local version indicator 234c (i.e., "HH:4") from the playback device 110a, the playback device 110b compares that to its own local version indicator 234b (i.e., "HH:1"). Because the updated version indicator 234c is newer than its own local version indicator 234b (i.e., "HH:4" is greater in value than "HH:1"), the playback device 110b obtains the modified ACCOUNT A record 230c from the playback device 110a and provisions itself with the new access credential 240c (i.e., replaces "TOKEN A1" with "TOKEN A2"). The playback device 110b also updates its own sequence indicator 214b, local version indicator 234b, and local replication indicator 216b, which results in the playback device 110b's accounts replicated setting to mirror that of the playback device 110a. In practice, the other playback devices 110c-110n perform a similar set of operations to provision themselves in accordance with the change to the account replicated setting.

Without the local replication functionality, some playback devices 110a-110n may operate in one manner that conflicts with another manner in which other playback devices are operating, which can result in the media playback system 100 operating abnormally (if at all). Moreover, the local replication functionality is advantageous because each playback device 110a-110n maintains its own replicated setting files. As such, if one playback device is disconnected from the media playback system 100, is powered down, or otherwise is no longer available, the remainder of the media playback system 100 continues to operate. Another advantage is that the aforementioned local replication functionality allows for playback devices 110a-110n to replicate portions of a replicated setting file, such as a record thereof, as opposed to the whole file. This may help minimize the amount of network resources that the media playback system 100 consumes during replication. Other advantages of the local replication functionality will be apparent to a person of ordinary skill in the art.

Returning to FIG. 3, at step 308, the playback device 110a carries out the cloud replication phase that generally involves causing the remote service 106a to be provisioned in accordance with the change to the property of the cloud replicated setting.

To facilitate the cloud replication phase, the media playback system 100 is configured to designate one playback device (i.e., the "designated playback device") that interfaces with remote services on behalf of the media playback system 100 and manages cloud replicated settings. In the example illustrated in FIG. 3, the playback device 110a is the designated playback device.

In example embodiments, the designated playback device is selected based on a comparison of respective values of a particular property (or in some instances, multiple properties) of the playback devices 110a-110n of the media playback system 100. In practice, the particular property may be fixed or dynamic. For example, each playback device 110a-110n is assigned a unique identifier, such as a serial number or the like, each playback device 110a-110n is aware of the other devices' unique identifiers, and the playback devices 110a-110n compare the values of the unique identifiers and elect the playback device with the lowest value as the designated playback device. As another example, the particular property may be the present signal strengths of the playback devices within the local communication network 104 (e.g., the device's WiFi strength), and the playback device with the highest signal strength is elected the designated playback device. In another example, the particular property may be the presence of an active wired connection, such as a wired network connection to the local communication network 104 (e.g., an Ethernet connection) and/or a wired connection to a power source (e.g., a wall outlet or the like), and the playback device with such an active wired connection (or perhaps the most such wired connections) is elected the designated playback device. In yet another example, the particular property may be the remaining battery life of the playback devices, and the playback device with the highest remaining battery life is elected the designated playback device. Other examples of selecting a designated playback device are also possible.

This arrangement involving a single playback device acting as a proxy between the media playback system 100 and remote services may provide one or more benefits. For instance, without the designated playback device, each playback device 110a-110n in the media playback system 100 would perform network transactions with the remote service 106a when there is a modification to a cloud replicated setting. Thus, the use of a designated playback device helps to reduce the overall amount of network resources that the media playback system 100 consumes when it causes the remote service 106a to be provisioned in accordance with changes to cloud replicated settings.

In any event, the playback device 110a causing the remote service 106a to be provisioned in accordance with the change to the property of the cloud replicated setting can involve a variety of processes. In one example of a cloud replication phase, the playback device 110a first determines whether there are any changes to properties of cloud replicated settings that the remote service 106a should be provisioned with, which it may do based at least on local version indicators corresponding to the properties of the cloud replicated setting.

For example, as noted before with reference to FIG. 2C, the playback device 110a determines that the remote service 106a should be provisioned with the ACCOUNT A record 230c because a value of the local replication indicator 216c now matches the value of the local version indicator 234c corresponding to the record 230c. As another example, the playback device 110a may define a timeframe of interest based on a present time serving as the upper bound of the timeframe and a local replication indicator that takes the form of a last-local-replication time indicator serving as the lower bound of the timeframe. Based on the timeframe of interest, the playback device 110a may identify any changes to properties of cloud replicated settings by identifying local-version indicators taking the form of last-modified times that fall within the timeframe of interest. Other examples of determining whether there are any changes to properties of cloud replicated settings that the remote service 106a should be provisioned with are also possible.

In practice, the playback device 110a may determine that there are multiple outstanding changes to a cloud replicated setting (or multiple cloud replicated settings) that the remote service 106a should be provisioned with, which may occur for a variety of reasons. For example, the playback device 110a may be configured to execute the cloud replication phase periodically and there may have been multiple changes to the cloud replicated setting within a particular period. As another example, the playback device 110a may have been unsuccessful in executing an iteration of the cloud replication phase after which an additional iteration of a local replication phase occurred. Other examples are also possible.

To illustrate multiple outstanding changes to a cloud replicated setting that the remote service 106a should be provisioned with, FIG. 2D provides a conceptual diagram of an example accounts replicated setting file 200d stored by the playback device 110a in its data storage at a fourth point in time. This fourth point in time is after the third point in time represented by FIG. 2C and is after the playback device 110a performed another iteration of the local replication phase (i.e., steps 302-306) due to a change to the ACCOUNT B record 250d but prior to the playback device 110a performing a cloud replication after the third point in time.

As shown, the ACCOUNT B record 250d indicates that the access credential 260d has been updated with a new access token (i.e., "TOKEN B2"). The local version indicator 254d has been updated to "HH:5," reflecting when the playback device 110a was provisioned with the new access token. The clock reading for the local version indicator 254d was populated to the local replication indicator 216d, which now stores two values. From these two stored values, the playback device 110a determines that the remote service 106a should be provisioned with the ACCOUNT A record 230d and the ACCOUNT B record 250d.

Returning to the example cloud replication phase, after the playback device 110a determines that there are changes to properties of cloud replicated settings that the remote service 106a should be provisioned with, the playback device 110a provides to the remote service 106a a replication dataset including, for each changed property of the cloud replicated setting, at least the value of the property and a cloud version indicator signifying a version of the property that the remote service 106a was most recently provisioned in accordance with. In some implementations, the replication dataset may also include, for each changed property of the cloud replicated setting, an identifier corresponding to the changed property, such as a record identifier.

As one example, returning to FIG. 2D, the playback device 110a may provide in a replication dataset (i) data from the ACCOUNT A record 230d including the record identifier, cloud version indicator, and access credential (e.g., "ACCOUNT A," "C:1," and "TOKEN A2") and (ii) data from the ACCOUNT B record 250d including the record identifier, cloud version indicator, and access credential (e.g., "ACCOUNT B," "C:1," and "TOKEN B2").

The remote service 106a then utilizes at least the received replication dataset to carry out a procedure similar to the local replication functionality that is performed by the playback devices 110b-110n to provision itself with the cloud replicated setting. In practice, the remote service 106a maintains its own data structure corresponding to the particular cloud replicated setting that it is presently provisioned with. This data structure may be referred to herein as a replicated setting "cloud file."

In some implementations, a cloud file may include some or all of the same attributes as the corresponding replicated setting file stored by playback devices 110a-110n. For example, a cloud file may include records for a cloud replicated setting, and for each record, the cloud file may include at least an attribute equivalent to a cloud version indicator (i.e., attributes equivalent to cloud version indicators 236b and 256b of the file 200b).

In any event, the remote service 106a may determine that it should be provisioned to reflect the values of the properties in the received replication dataset. In example embodiments, it makes this determination for any property values with a corresponding cloud version indicator that is not less than the value of its own version indicator for that property. In some embodiments, the remote service 106a is configured to reject property values that have a corresponding cloud version indicator that is less than its own version indicator. In other words, the remote service 106a may be configured to resolve conflicting property values in favor of the remote service 106a. In such circumstances, the remote service 106a would notify the playback device 110a that the attempted replication of the given property was rejected.

After the remote service 106a is provisioned in accordance with the changed properties identified in the replication dataset, the remote service 106a updates the cloud file. For instance, it may increment a replication indicator reflecting the remote service 106a being successfully provisioned. The remote service 106a then sends a message to the playback device 110a confirming a successful replication, which also includes an indication of the remote service 106a's replication indicator.

The playback device 110a then updates its own local file for the cloud replicated setting. For instance, FIG. 2E provides a conceptual diagram of an example accounts replicated setting file 200e stored by the playback device 110a in its data storage at a fifth point in time. This fifth point in time is after the fourth point in time represented by FIG. 2D and is after the playback device 110a updated its local file 200d after receiving confirmation from the remote service 106a of a successful cloud replication.

As shown, the cloud replication indicator 218e has been updated to reflect a clock reading ("C:2") corresponding to the remote service 106a's most recent replication, and the cloud version indicators 236e and 256e have also been updated to reflect the clock reading when the remote service 106a was provisioned in accordance with the records 230d and 250d. Lastly, the local replication indicator 216e has been updated by the current value of the media playback system 100 clock source, effectively resetting the local replication indicator 216e.

Thus, in sum, a player-side modification to a cloud replicated setting causes the execution of a local replication phase and a remote replication phase, thereby facilitating coordination between the media playback system 100 and the remote service 106a that helps enable proper operation of the media playback system 100. This multi-phase replication process is beneficial at least because it allows the media playback system 100 to maintain a replication structure that is independent of the remote service 106a that might not be available to the media playback system 100 at all times (e.g., as a result of network connectivity issues or the like). Other benefits of the multi-phase replication process will be apparent to a person of ordinary skill in the art.

Returning to FIG. 3, in addition to handling player-side modifications to cloud replicated settings, the media playback system 100 is configured to handle remote modifications to cloud replicated settings. In practice, at step 310, the remote service 106a identifies a change to a cloud replicated setting, which it may perform similar to the playback device 110a identifying a change to a cloud replicated setting at step 302. As one example of a remote modification, the remote service 106a may receive a refreshed or otherwise modified version of an access credential for a particular media-service account (e.g., an access token), which it might receive from another remote service (e.g., the particular media service itself or a SMAPI service) via the cloud network 102.

At step 312, the remote service 106a is provisioned in accordance with the change to the cloud replicated setting in line with the operations it performs at step 308. Next, at step 314, the remote service 106a sends to a particular playback device, such as the playback device 110a, a request for the media playback system 100 to initiate a replication based on a remote modification to a property of a cloud replicated setting. As noted before, this type of replication may be referred to herein as a "pull replication." In example embodiments, the request includes at least an identifier of the cloud replicated setting that should be replicated by the media playback system 100 (e.g., a setting identifier). Additionally, or alternatively, the request may include an identifier corresponding to the property that has been changed (e.g., a record identifier).

In example embodiments, the remote service 106a determines which particular playback device 110a-110n of the media playback system 100 it should send the pull replication request to. For example, the remote service 106a may make the determination based on a device property of the playback devices 110a-110n or some other criteria, which may be the same or different from the criteria used to determine the designated playback device of the media playback system 100. In some embodiments, the remote service 106a determines the particular playback device based on whichever playback device is selected to be the designated playback device of the media playback system 100. Other examples are also possible.

In response to receiving the request, at step 316, the playback device 110a initiates a pull replication phase, which may involve a variety of processes. In one example of a pull replication phase, the playback device 110a first transmits to the remote service 106a a cloud-replication indicator representing the last known instance at which the remote service 106a was provisioned in accordance with the cloud replicated setting.

Based on the cloud-replication indicator, the remote service 106a identifies at least one replicated-setting property that has undergone a remote modification since the last instance at which the remote service 106a was provisioned in accordance with the cloud replicated setting. The remote service 106a may perform this function in a variety of manners.

For example, the remote service 106a may define a timeframe of interest based on a present time serving as the upper bound of the timeframe and the cloud-replication indicator serving as the lower bound of the timeframe. Based on the timeframe of interest, the remote service 106a may identify any changes to properties of cloud replicated settings by identifying version indicators that fall within the timeframe of interest. Other examples are also possible.

At step 318, the remote service 106a sends to the playback device 110a a replication dataset including the value of the identified at least one replicated-setting property and a corresponding version indicator signifying the version of the property that the remote service is presently provisioned with. This version indicator is equivalent to the cloud version indicator stored by the playback devices 110a-110n.

At step 320, the playback device 110a utilizes at least the received replication dataset to provision itself with the modified property of the cloud replicated setting, which it may do in line with the operations discussed at step 304. For instance, the playback device 110a may compare its existing cloud version indicator corresponding to the replicated setting property to version indicator provided by the remote service 106a and determine that this version indicator corresponds to a newer version of the replicated-setting property. Based on that determination, the playback device 110a may replace its existing value for the replicated-setting property with the updated value from the replication dataset provided by the remote service 106a. The playback device 110a may also update its copy of the file corresponding to the replicated-setting property.

To illustrate, FIG. 2F provides a conceptual diagram of an example accounts replicated setting file 200f stored by the playback device 110a in its data storage at a sixth point in time. This sixth point in time is after the fifth point in time represented by FIG. 2E and is after the playback device 110a provisioned itself in response to a pull replication phase during which the remote service 106a provided a refreshed access credential for ACCOUNT A.

As shown, the playback device 110a updated its access credential 240f to reflect the refreshed access token, "TOKEN A3." The playback device 110a also updated the cloud version indicator 236f with the clock reading corresponding to when the remote service 106a provisioned itself with the refreshed access token (i.e., with the value of the version indicator provided by the remote service 106a in the replication dataset). Notably, the playback device updated the origin indicator 238*f* to reflect that this change to the ACCOUNT A record 230*f* originated at the remote service 106*a* (i.e., "C534" is an identifier that uniquely identifies the remote service 106*a* from other remote devices).

In some embodiments, the playback device 110*a* performs these operations even when it determines that version indicator from the remote service 106*a* is equivalent to its existing cloud-version indicator. In this way, the playback device 110*a* resolves a version conflict in favor of the remote service 106*a*.

Returning to FIG. 3, at step 322, the playback device 110*a* causes the other playback devices 110*b*-110*n* of the media playback system 100 to carry out a local replication process in line with step 306. For instance, FIG. 2E represents the playback device 110*b*'s copy of the accounts replicated setting at the sixth point in time. The playback device 110*a* provides to the playback device 110*b* (as well as the other playback devices) an indication of the update to the record 230*f*. Based on the cloud version indicator 236*f* being greater than the cloud version indicator 236*e* stored by the playback device 110*b*, the playback device 110*b* is configured to replicate the new version of the ACCOUNT A record 230*f* from the playback device 110*a*. The other playback devices 110*c*-110*n* perform a similar process as well.

Thus, in sum, a remote modification to a cloud replication setting causes the execution of a pull replication phase that involves playback devices 110*a*-110*n* performing local replication based on replicated settings information from the remote service 106*a*, thereby facilitating coordination between the media playback system 100 and remote service 106*a* that helps enable proper operation of the media playback system 100.

d. Example Replication in a Split Media Playback Systems

At times, playback devices 110*a*-110*n* of the media playback system 100 may be arranged in different geographic locations, but the playback devices 110*a*-110*n* maintain their respective memberships to the media playback system 100. For example, a user may establish the media playback system 100 including at least the playback device 110*a* and the playback device 110*b* at her home on a first local communication network (e.g., her home WiFi network), but at a later time, the user may bring one of the playback devices (e.g., the playback device 110*b*) to her office and connect that playback device to a second local communication network (e.g., her workplace WiFi network).

As noted above, such an arrangement may be referred to herein as a "split" media playback system, and each collection of one or more playback devices from the media playback system that are at a particular geographic location may be referred to herein as a "partition" of the media playback system. For example, in the above example, the first playback device is part of a "home" partition, while the second playback device is part of an "office" partition.

In operation, when the media playback system 100 is arranged as a split media playback system, the media playback system 100 may be configured to assign a partition identifier to each partition. The partition identifier uniquely identifies one partition from all other partitions. In some examples, a partition identifier includes an indication of the particular geographic location at which the partition is located. In some instances, the partition identifier may include networking information from equipment that provides the local communication network for the particular partition. Other examples are also possible.

In a split media playback system, it may be beneficial for replicated settings to be maintained across the different partitions of the split system. In other words, a change to a replicated setting in one partition should be reflected in all other partitions of the split media playback system. In this way, a user's experience with the media playback system at one geographic location (e.g., her home) will be the same as at another geographic location (e.g., her office).

To facilitate this functionality, the media playback system 100 utilizes the same or similar functions described before, as well as some modifications and additions thereto. In some implementations, each partition has a respective designated playback device that interfaces with remote services on behalf of the given partition. The designated playback devices may be configured with capabilities in addition to those described before.

Figure 4:
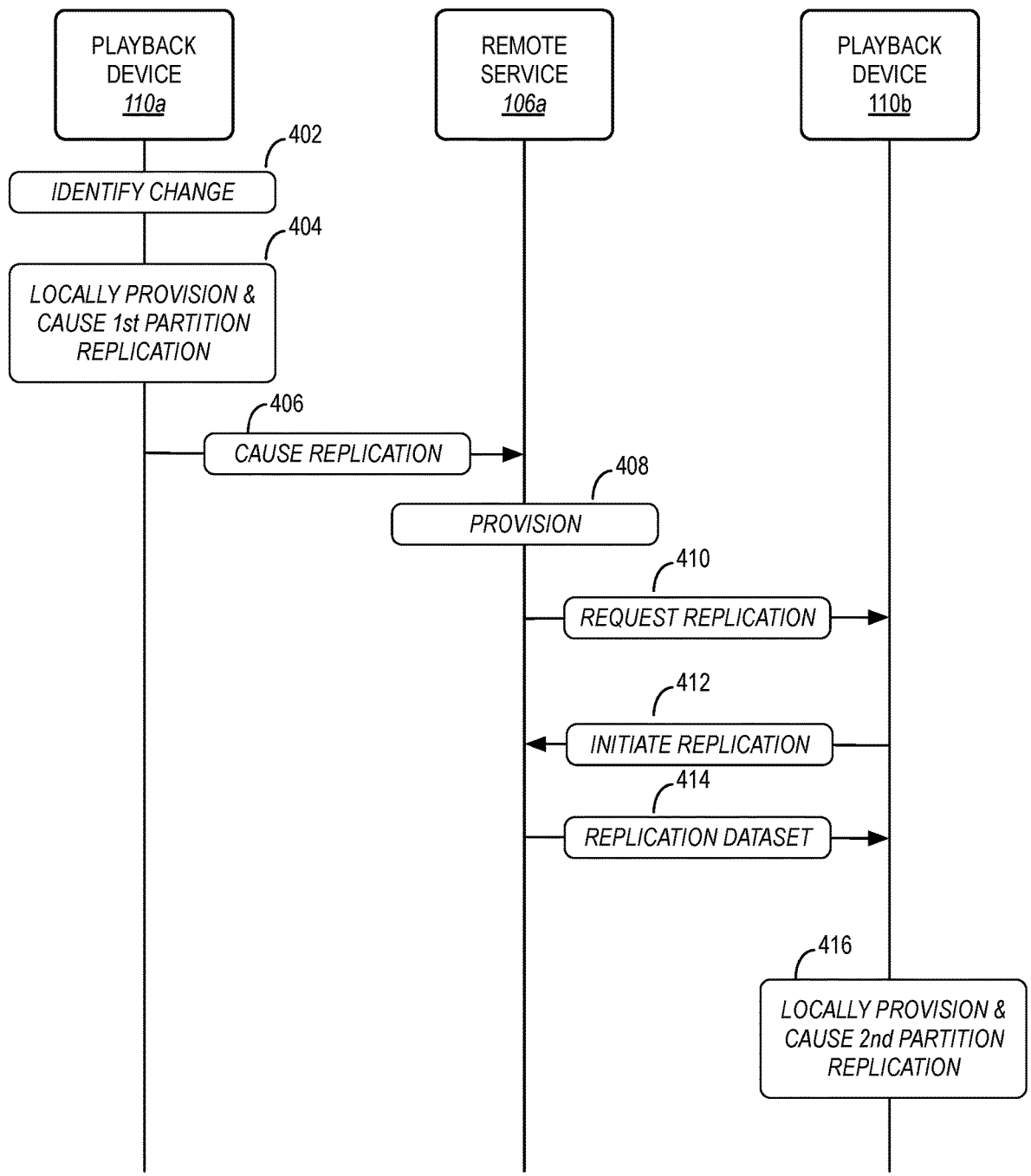
FIG. 4 is a message flow diagram illustrating data transactions between devices in different partitions of a media playback system and a remote service.

For purposes of explanation and illustration of modifications to cloud replicated settings in a split media playback system arrangement, FIG. 4 is a message flow diagram illustrating data transactions between devices in different partitions of the media playback system 100 and the remote service 106*a*. In particular, the message flow diagram includes the playback device 110*a* serving as the designated playback device of a first partition of the media playback system 100, the remote service 106*a*, and the playback device 110*a* serving as the designated playback device of a second partition of the media playback system 100. The message flow diagram illustrates example data transactions involved with a player-side modification to a property of a cloud replicated setting that enters at the first partition.

For instance, at step 402, the playback device 110*a* is part of the first partition of the media playback system 100 that is connected to a first local communication network (e.g., her home WiFi network), and the playback device 110*a* identifies a change to a property of a cloud replicated setting at the first partition. The playback device 110*a* may perform this function in line with the above discussion with reference to step 302 of FIG. 3.

At step 406, the playback device 110*a* provisions itself in accordance with the identified change to the property of the cloud replicated setting and then causes one or more other playback devices that are part of the first partition to be provisioned in accordance with the identified change to the property of the cloud replicated setting as well. These functions are performed in line with the above discussion with reference to steps 304 and 306 of FIG. 3. During this local replication phase, in addition to the processes described before, an origin indicator is stored indicating the location at which the modification entered the media playback system 100. In example embodiments, the origin indicator takes the value of the partition identifier assigned by the media playback system 100 to the first partition.

At step 406, the playback device 110*a* carries out an iteration of the cloud replication phase that generally involves causing the remote service 106*a* to be provisioned in accordance with the change to the property of the cloud replicated setting. This function is performed in line with the above discussion with reference to step 308 of FIG. 3. Moreover, the playback device 110*a* also provides in the replication data the origin indicator identifying the location (e.g., partition) at which the modification to the replicated-setting property entered the system.

At step 408, the remote service 106*a* is provisioned in accordance with the change to the property of the cloud replicated setting. This function is performed in line with the above-discussed functions that were performed by the remote service 106*a* with reference to step 308 of FIG. 3. Additionally, the remote service 106*a* may be configured to, based on the origin indicator identifying a particular partition, determine that the other partitions of the media playback system 100 should be provisioned in accordance with the change to the property of the cloud replicated setting as well.

In turn, at step 410, the remote service 106a sends to a particular playback device of the second partition, such as the playback device 110b, a request for that partition of the media playback system 100 to initiate a pull replication based on the change to the property of the cloud replicated setting. This function is performed in line with the above discussion with reference to step 314 of FIG. 3.

At step 412, the playback device 110b, which may be serving as the designated playback device for the second partition, the playback device 110b initiates a pull replication phase. This function is performed in line with the above discussion with reference to step 316 of FIG. 3.

At step 414, the remote service 106a sends to the playback device 110b a replication dataset including the value of the change to the property of the cloud replicated setting. This function is performed in line with the above discussion with reference to step 316 of FIG. 3. However, instead of the remote service 106a providing its version indicator that is equivalent to the cloud version indicator stored by the playback devices 110a-110n, the remote service 106a may provide the local version indicator corresponding to the version of the property of the cloud replicated setting that the first partition is provisioned in accordance with. In example embodiments, the playback device 110a provides its local version indicator to the remote service 106a at step 406.

Lastly, at step 418, the playback device 110b provisions itself in accordance with the identified change to the property of the cloud replicated setting and then causes one or more other playback devices that are part of the second partition to be provisioned in accordance with the identified change to the property of the cloud replicated setting as well. These functions are performed in line with the above discussion with reference to steps 320 and 322 of FIG. 3. However, the local replication phase is triggered based on the more recent value of the local version indicator corresponding to the change to the property of the cloud replicated setting, as opposed to the cloud version indicator.

Thus, in sum, a player-side modification to a cloud replicated setting at one partition of a split media playback system is effectively handled by any other partitions as a remote modification to the cloud replicated setting.

In example embodiments, for a remote modification that does not originate from a partition of the media playback system 100, a particular playback device of each partition (e.g., the designated playback device of each partition) receives a replication request from the remote service 106a and then, performs a pull replication with the remote service 106a in line with the above discussion.

IV. Conclusion

The above discussions relating to playback devices, controller devices, playback zone configurations, and media content sources provide only some examples of operating environments within which functions and methods described herein may be implemented. Other operating environments and configurations of media playback systems, playback devices, and network devices not explicitly described herein may also be applicable and suitable for implementation of the functions and methods.

As described above, the embodiments described herein relate to a distributed architecture in which defining or changing a property of an operational setting of a media playback system results in playback devices of the media playback system, as well as one or more remote devices (e.g., one or more cloud-service servers), being provisioned in accordance with the defined or changed property of the operational setting. This distributed architecture helps to enable the media playback system to coordinate with the one or more remote devices and to ensure that the media playback system is in a proper operational state.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device of a media playback system, the playback device comprising:
   a network interface configured to communicatively couple the playback device to (i) at least one additional playback device of the media playback system via a local communication network and (ii) a remote computing device located outside of the local communication network;
   one or more processors; and
   a tangible, non-transitory computer-readable medium having instructions stored thereon, wherein the instructions, when executed by the one or more processors, cause the playback device to:

identify a change to a property of an operational setting of the media playback system, wherein the property affects an operational state of the playback device;

based on the identified change to the property of the operational setting:
(i) locally provision the playback device in accordance with the identified change to the property of the operational setting;
(ii) determine a local version indicator corresponding to the playback device being locally provisioned in accordance with the identified change to the property of the operational setting; and
(iii) based at least on the local version indicator, cause, via the local communication network, the at least one additional playback device to be provisioned in accordance with the identified change to the property of the operational setting; and based at least on (i) the local version indicator and (ii) a remote-version indicator stored on the playback device that corresponds to a prior provisioning of the remote computing device, cause the remote computing device to be provisioned in accordance with the identified change to the property of the operational setting.

2. The playback device of claim 1, wherein the local communication network comprises one of (i) a local area network, (ii) a personal area network, or (iii) a communication network dedicated for the media playback system.

3. The playback device of claim 1, wherein the property of the operational setting comprises one of (i) a media service credential for a particular media service accessible by the media playback system, (ii) a feature of a playlist comprising a plurality of media items reproducible by the media playback system, or (iii) an attribute of a media alarm executable by the media playback system.

4. The playback device of claim 1, wherein the local version indicator comprises a first time value indicating when the playback device locally provisioned itself in accordance with the identified change to the property of the operational setting, and wherein the remote-version indicator comprises a second time value indicating when the remote computing device was previously provisioned.

5. The playback device of claim 1, wherein identifying the change to the property of the operational setting comprises receiving from a control device, via the local communication, user input data representing a request to change the property of the operational setting.

6. The playback device of claim 1, wherein the remote computing device is a first computing device located outside of the local communication network, and wherein identifying the change to the property of the operational setting comprises receiving from a second computing device located outside of the local communication network an indication of the change to the property of the operational setting.

7. The playback device of claim 6, wherein the second computing device comprises a computing device configured to interface with one or more media services accessible by the media playback system, and wherein the indication of the change to the property of the operational setting comprises an access credential for a particular media service.

8. The playback device of claim 1, wherein causing the remote computing device to be provisioned in accordance with the identified change to the property of the operational setting comprises transmitting to the remote computing device at least (i) an indication of the change to the property of the operational setting and (ii) the remote-version indicator.

9. The playback device of claim 1, wherein causing the remote computing device to be provisioned in accordance with the identified change to the property of the operational setting comprises enabling the remote computing device to affect an operational condition of the media playback system.

10. A computer-implemented method performed by a playback device of a media playback system, the method comprising:

identifying a change to a property of an operational setting of the media playback system, wherein the property affects an operational state of the playback device;

based on the identified change to the property of the operational setting:
(i) locally provisioning the playback device in accordance with the identified change to the property of the operational setting;
(ii) determining a local version indicator corresponding to the playback device being locally provisioned in accordance with the identified change to the property of the operational setting; and
(iii) based at least on the local version indicator, causing, via a local communication network, at least one additional playback device of the media playback system to be provisioned in accordance with the identified change to the property of the operational setting; and based at least on (i) the local version indicator and (ii) a remote-version indicator stored on the playback device that corresponds to a prior provisioning of a remote computing device located outside of the local communication network and communicatively coupled to the playback device, causing the remote computing device to be provisioned in accordance with the identified change to the property of the operational setting.

11. The method of claim 10, wherein the local communication network comprises one of (i) a local area network, (ii) a personal area network, or (iii) a communication network dedicated for the media playback system.

12. The method of claim 10, wherein the property of the operational setting comprises one of (i) a media service credential for a particular media service accessible by the media playback system, (ii) a feature of a playlist comprising a plurality of media items reproducible by the media playback system, or (iii) an attribute of a media alarm executable by the media playback system.

13. The method of claim 10, wherein the remote computing device is a first computing device located outside of the local communication network, and wherein identifying the change to the property of the operational setting comprises receiving from a second computing device located outside of the local communication network an indication of the change to the property of the operational setting.

14. The method of claim 10, wherein causing the remote computing device to be provisioned in accordance with the identified change to the property of the operational setting comprises enabling the remote computing device to affect an operational condition of the media playback system.

15. A non-transitory computer-readable medium having instructions stored thereon, wherein the instructions, when executed by a one or more processors, cause a playback device of a media playback system to:

identify a change to a property of an operational setting of the media playback system, wherein the property affects an operational state of the playback device;

based on the identified change to the property of the operational setting:
  (i) locally provision the playback device in accordance with the identified change to the property of the operational setting;
  (ii) determine a local version indicator corresponding to the playback device being locally provisioned in accordance with the identified change to the property of the operational setting; and
  (iii) based at least on the local version indicator, cause, via a local communication network, at least one additional playback device of the media playback system to be provisioned in accordance with the identified change to the property of the operational setting; and based at least on (i) the local version indicator and (ii) a remote-version indicator stored on the playback device that corresponds to a prior provisioning of a remote computing device, cause the remote computing device located outside of the local communication network and communicatively coupled to the playback device to be provisioned in accordance with the identified change to the property of the operational setting.

16. The non-transitory computer-readable medium of claim 15, wherein the property of the operational setting comprises one of (i) a media service credential for a particular media service accessible by the media playback system, (ii) a feature of a playlist comprising a plurality of media items reproducible by the media playback system, or (iii) an attribute of a media alarm executable by the media playback system.

17. The non-transitory computer-readable medium of claim 15, wherein identifying the change to the property of the operational setting comprises receiving from a control device, via the local communication, user input data representing a request to change the property of the operational setting.

18. The non-transitory computer-readable medium of claim 15, wherein the remote computing device is a first computing device located outside of the local communication network, and wherein identifying the change to the property of the operational setting comprises receiving from a second computing device located outside of the local communication network an indication of the change to the property of the operational setting.

19. The non-transitory computer-readable medium of claim 18, wherein the second computing device comprises a computing device configured to interface with one or more media services accessible by the media playback system, and wherein the indication of the change to the property of the operational setting comprises an access credential for a particular media service.

20. The non-transitory computer-readable medium of claim 15, wherein causing the remote computing device to be provisioned in accordance with the identified change to the property of the operational setting comprises transmitting to the remote computing device at least (i) an indication of the change to the property of the operational setting and (ii) the remote-version indicator.

* * * * *